(12) United States Patent
Auzerais et al.

(10) Patent No.: US 9,069,099 B2
(45) Date of Patent: Jun. 30, 2015

(54) METHOD AND APPARATUS FOR MONITORING ACOUSTIC ACTIVITY IN A SUBSURFACE FORMATION

(75) Inventors: Francois M. Auzerais, Boston, MA (US); William B. Underhill, Richmond, TX (US); Theodore Bruce Lafferty, Jr., Sugar Land, TX (US); Peter Airey, Yokohama (JP)

(73) Assignee: Schlumberger Technology Corporation, Sugar Land, TX (US)

( * ) Notice: Subject to any disclaimer, the term of this patent is extended or adjusted under 35 U.S.C. 154(b) by 332 days.

(21) Appl. No.: 13/017,039

(22) Filed: Jan. 30, 2011

(65) Prior Publication Data

US 2011/0188348 A1 Aug. 4, 2011

Related U.S. Application Data

(60) Provisional application No. 61/300,796, filed on Feb. 2, 2010.

(51) Int. Cl.
*G01V 1/00* (2006.01)
*G01V 1/40* (2006.01)

(52) U.S. Cl.
CPC ........................................ *G01V 1/40* (2013.01)

(58) Field of Classification Search
CPC ........................................................ G01V 1/40
USPC ............................................................ 367/86
See application file for complete search history.

(56) References Cited

U.S. PATENT DOCUMENTS

| | | | |
|---|---|---|---|
| 7,800,513 B2 * | 9/2010 | Morys | 340/853.1 |
| 7,894,297 B2 * | 2/2011 | Nutt et al. | 367/25 |
| 8,210,257 B2 * | 7/2012 | Dusterhoft et al. | 166/250.1 |
| 2004/0160858 A1 * | 8/2004 | Ciglenec et al. | 367/83 |
| 2005/0045329 A1 * | 3/2005 | Wetzel et al. | 166/278 |
| 2005/0150691 A1 * | 7/2005 | Schultz et al. | 175/57 |
| 2007/0165487 A1 * | 7/2007 | Nutt et al. | 367/25 |
| 2007/0215345 A1 * | 9/2007 | Lafferty et al. | 166/250.1 |

FOREIGN PATENT DOCUMENTS

| | | |
|---|---|---|
| WO | 03/027717 | 4/2003 |
| WO | 2007/105167 | 9/2007 |
| WO | 2009/118625 | 10/2009 |

* cited by examiner

*Primary Examiner* — Luke Ratcliffe
*Assistant Examiner* — Hovhannes Baghdasaryan
(74) *Attorney, Agent, or Firm* — Daryl R. Wright; Jody DeStefanis

(57) ABSTRACT

A method and apparatus is disclosed for monitoring microseismic activity in a formation. The method and apparatus include placing a tool string having a shuttle including a sensor thereon in a stimulation well, and activating the shuttle to acoustically couple the sensor to an inner surface of a casing. The sensor is acoustically decoupled from the tool string. Fluid is then injected into the formation via the tool string. The sensor is reengaged with the tool string. The tool string may then be removed from the stimulation well or moved to another position along the wellbore.

20 Claims, 12 Drawing Sheets

F I G . 5
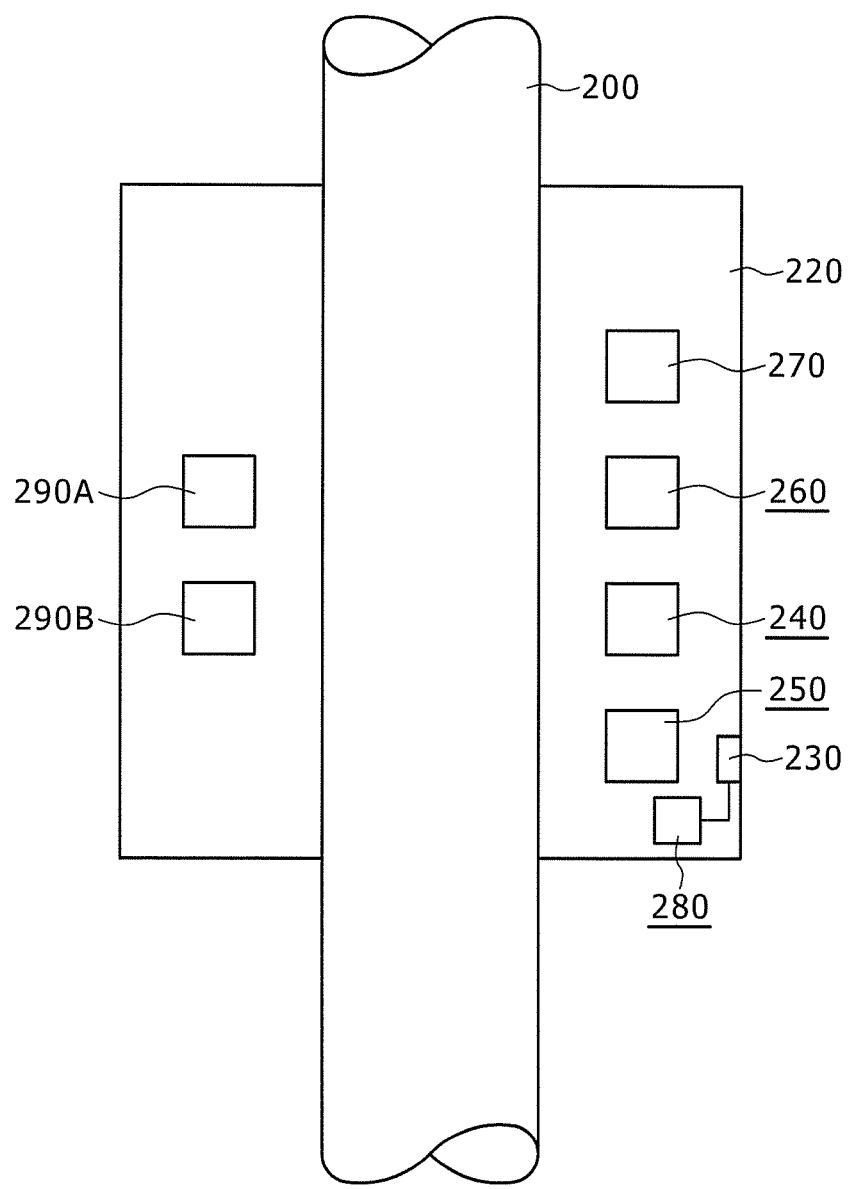

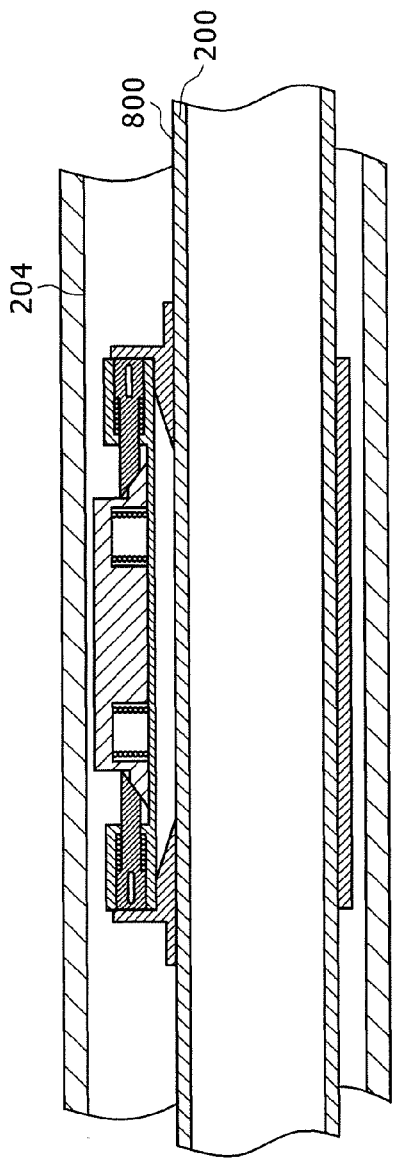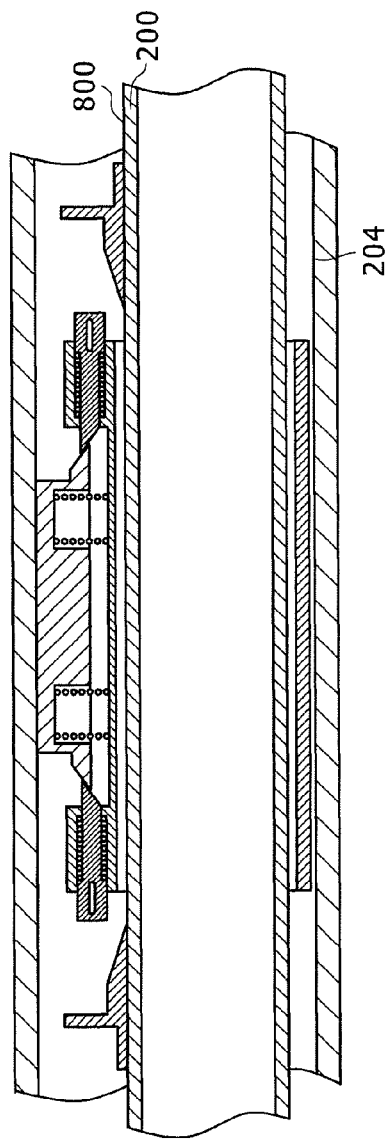

METHOD AND APPARATUS FOR MONITORING ACOUSTIC ACTIVITY IN A SUBSURFACE FORMATION

RELATED APPLICATIONS

This application claims the benefit of U.S. Provisional Application No. 61/300,796, filed Feb. 2, 2010, the contents of which are herein incorporated by reference for all purposes.

BACKGROUND

1. Field of the Disclosure

The present disclosure generally relates to methods and apparatus for monitoring subsurface formations. More particularly, the present disclosure relates to methods and apparatus for sensing and monitoring acoustic activity, and specifically microseismic activity, in subsurface formations.

2. Description of the Related Art

The following descriptions and examples are not admitted to be prior art by virtue of their inclusion in this section.

Oil reservoirs are becoming more and more depleted and require proactive methods in order to maximize the hydrocarbon or oil recovery. One of those proactive methods includes pumping operations conducted in oil and gas wells to increase production and recovery rates of producer or injector wells. The pumping of fluid is required for a variety of operations including hydro-fracturing and acidizing, collectively referred to as "stimulation". Stimulation is used to increase conductivity of a subterranean formation for recovery or production of hydrocarbons and to permit injection of fluids into subterranean formation. For instance, in injector wells, it is common to stimulate an injection zone by placing an acid to increase injectability rates; in the production of hydrocarbons from the earth, it is widespread to hydraulically fracture a producing formation to increase its permeability and subsequent production.

In a typical hydraulic fracturing operation, a fracturing fluid is injected under pressure into the formation through an injection well. This fluid may carry entrained particulate matter such as sand or gravel (known as proppant) that is deposited in the fracture as it is formed to hold open the fracture after the fracturing pressure is relaxed. Another similar application is one in which waste material is mixed into a slurry with the fracturing fluid and injected for disposal in the subterranean formation.

One important consideration for stimulating or fracturing for hydrocarbon production and waste disposal is that the fracture should be directed toward the most desirable part of the formation. The formation should not only be capable of being stimulated or hydraulically fractured, but containment barriers should also be bounding it. Unfortunately most formations do not have ideal characteristics for stimulation. Consequently, it is important to monitor the placement of the stimulation fluid as it is being pumped to insure that it does not extend beyond the intended zone.

One method of monitoring the location and size of a hydraulic fracture is called microseismic mapping. In this method, a plurality of acoustic sensors (e.g. geophones) are positioned in spaced (i.e., offset from the injection) wells, such as adjacent or nearby monitoring wells, and the sensors are used to record signals from micro-earthquakes (microseisms) caused by the stress induced by the fracture fluid pressure build up. The microseisms are localized and occur during the growth of fractures. The amplitude of the seismic or acoustical energy (compressional ("P") waves and shear ("S") waves) are generated with significant enough amplitude to be detected by acoustic sensors. Accordingly, by sensing and recording the P and S waves and their respective arrival times at each of the sensors, the acoustical signals can be processed in accordance with known seismic and/or earthquake monitoring methodology to determine the position of the microseisms. Hence the geometry of the fracture and its location may be inferred.

As noted above, this type of pumping operation is conducted in a near or adjacent monitoring well, such that the producer or injector well can be monitored from a distance without the monitoring equipment causing interference in the producer or injector well. However, monitoring wells are not always available or suitable for such monitoring (e.g., if located too far away from the injection well). An alternate approach would be to conduct the monitoring in the producer or injector well, which, as stated previously, introduces the issue of interference. Moreover, using the producer or injector well poses the problem of obtaining precise readings of microseismic data in a high noise environment, mostly resulting from the pumping and delivery of the fracture fluid.

Accordingly, the present disclosure is directed to a method and apparatus for integrating stimulation and monitoring of earth formation from inside the stimulated well.

SUMMMARY OF THE DISCLOSURE

According to one embodiment disclosed herein, a method is disclosed of monitoring microseismic activity in a formation interacting with a stimulation well. The method includes positioning a tool string in the stimulation well and activating a packer disposed at a distal end of the tool string. Activating the packer includes sealing an annulus defined by the tool string and an inner surface of a casing lining the stimulation well. In addition, the method includes disposing at least one shuttle including a sensor on the tool string. Disposing includes engaging the shuttle to the tool string.

Further steps include activating the shuttle in the stimulation well, wherein activating includes acoustically coupling the sensor to the inner surface of the casing. Additionally, more steps include acoustically decoupling the sensor from the tool string and injecting fluid into the formation via the tool string and causing factures to occur. Steps may also include recording microseismic data resulting from the fractures via the sensor and reengaging the sensor to the tool string. Still more steps include removing the tool string and the shuttle from the stimulation well.

According to another embodiment, a method is disclosed of monitoring microseismic activity in a formation interacting with a stimulation well. The method includes positioning a tool string into the stimulation well. The tool string may include a tool disposed at a distal end thereof. The method further includes disposing at least one shuttle including a sensor on the tool string, wherein disposing includes engaging the shuttle to the tool string. Further steps include activating the shuttle in the stimulation well, wherein activating includes coupling the sensor to the inner surface of a casing lining the stimulation well and disengaging the sensor from the tool string. Steps may also include injecting fluid into the formation via the tool string recording microseismic data with the sensor. Additional steps may include storing the microseismic data into a memory communicably coupled to the sensor and reengaging the sensor to the tool string. Another step may be removing the tool string and the shuttle from the stimulation well.

According to another embodiment, an apparatus is disclosed for monitoring microseismic activity in a stimulation well interacting with a formation. The apparatus may include a tool string having at least one controllable shuttle, including a sensor, disposed thereon. The shuttle may be configured to acoustically couple the sensor to an inner surface of a casing lining the stimulation well and acoustically decouple the sensor from the tool string. The tool string may be configured for injecting operations into the formation. The sensor may be configured for detecting microseismic activity.

Other advantages and features will be apparent from the following detailed description when read in conjunction with the attached drawings and from the claims.

BRIEF DESCRIPTION OF THE DRAWINGS

Certain embodiments of the invention will hereafter be described with reference to the accompanying drawings, wherein like reference numerals denote like elements. It should be understood, however, that the accompanying drawings illustrate only the various implementations described herein and are not meant to limit the scope of various technologies described herein. The drawings are as follows:

FIG. 5 is a detailed schematic view of a shuttle, according to an embodiment of the present disclosure;

FIGS. 15 A-D are plan views, in partial cross-section, of yet another exemplary shuttle mechanism, according to an embodiment of the present disclosure.

Figure 1:
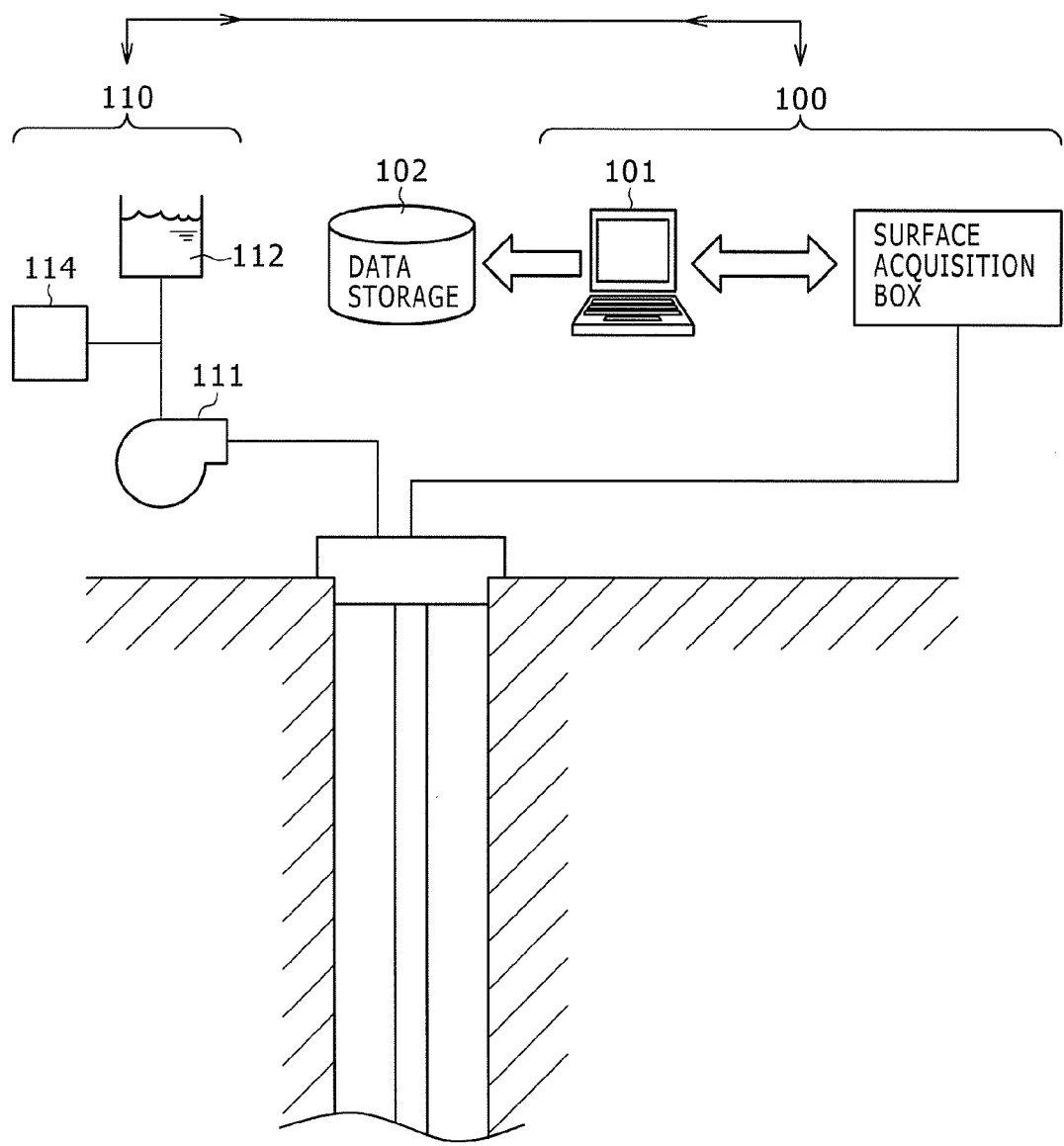
FIG. 1 is a schematic view of surface equipment and surface acquisition components utilized in conjunction with stimulation operations, according to an embodiment of the present disclosure.

While the principles described herein are susceptible to various modifications and alternative forms, specific embodiments have been shown by way of example in the drawings and will be described in detail herein. However, it should be understood that the disclosure is not intended to be limited to the particular forms disclosed. Rather, the disclosure includes all modifications, equivalents and alternatives falling within the scope of the appended claims.

DETAILED DESCRIPTION

So that the above recited features and advantages of the present disclosure can be understood in detail, a more particular description of the disclosure may be had by reference to the embodiments thereof that are illustrated in the accompanied drawings. It is to be noted, however, that the drawings illustrate only typical embodiments of this disclosure and are therefore not to be considered limiting of its scope, for the disclosure may admit to other equally effective embodiments.

Illustrative embodiments and aspects of the invention are described below. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such development effort might be complex and time-consuming, but would nevertheless be a routine undertaking for those of ordinary skill in the art having the benefit of this disclosure.

Reference throughout the specification to "one embodiment," "an embodiment," "some embodiments," "one aspect," "an aspect," or "some aspects" means that a particular feature, structure, method, or characteristic described in connection with the embodiment or aspect is included in at least one embodiment of the present invention. Thus, the appearance of the phrases "in one embodiment" or "in an embodiment" or "in some embodiments" in various places throughout the specification are not necessarily all referring to the same embodiment. Furthermore, the particular features, structures, methods, or characteristics may be combined in any suitable manner in one or more embodiments. The words "including" and "having" shall have the same meaning as the word "comprising."

The various techniques disclosed herein may be utilized to facilitate and improve data acquisition and analysis in downhole tools and systems. In this, downhole tools and systems are provided that utilize arrays of sensing devices that are configured or designed for easy attachment and detachment in downhole sensor tools or modules that are deployed for purposes of sensing data relating to environmental and tool parameters downhole, within a borehole. The tools and sensing systems disclosed herein may effectively sense and store characteristics relating to components of downhole tools as well as formation parameters at elevated temperatures and pressures. Chemicals and chemical properties of interest in oilfield exploration and development may also be measured and stored by the sensing systems contemplated by the present disclosure.

The sensing systems herein may be incorporated in tool systems such as wireline logging tools, measurement-while-drilling and logging-while-drilling tools, permanent monitoring systems, drill bits, drill collars, sondes, among others. For purposes of this disclosure, when any one of the terms wireline, cable line, slickline or coiled tubing or conveyance is used it is understood that any of the referenced deployment means, or any other suitable equivalent means, may be used with the present disclosure without departing from the spirit and scope of the present invention.

As noted previously, the present disclosure is directed to a method and apparatus for integrating stimulation and monitoring of an earth formation from inside a well that is being stimulated. These wells may be referred to as treatment, stimulation, producer or injector wells, amongst others, and will hereinafter be referred to as "stimulation wells." The apparatus/system may use real-time downhole measurements mounted in a bottom hole assembly or downhole tool and/or may use measurements mounted along a tool string, to interpret and optimize well treatments while they are still in progress.

The string may not only be a conduit for flow transport but may also comprise devices that can monitors injection rates, downhole pressure, temperature and acoustic formation properties. The real-time capability of measuring and analyzing incoming measurement data while stimulating provides an opportunity to monitor and evaluate job progress, to optimize treatment results, and to intervene with one trip and with one tool system disposed in the well. As a result, the presently disclosed system, apparatus and method allows maximized fluid penetration and diversion during stimulation, and allows optimizes treatment volumes while eliminating the need for a separate offset monitoring well. Accordingly, the costs of drilling and completing expensive and dedicated monitoring wells are eliminated and no existing production wells have to be shut in during the stimulation operation.

The above may be accomplished in conjunction with the following infrastructure/systems and the various described embodiments. Some of the components described herein are the most common parts of a stimulation work or tool string. However, more or less components may be added depending of the nature of the wells being stimulated and other requirements. For example, components disposed in the well, along with the tool string may include, a frac head, a pipe tester valve, a safety joint, a hydraulic hold down, a packer and a wireline entry guide. In addition, there may also be surface acquisition equipment located external of the well for communicating, collecting, processing and/or storing downhole measurement related data and information.

For example, as seen in FIG. 1, the surface acquisition equipment 100 may include a computer 101, processor, storage 102, etc. and may be equipped to process the measurement data obtained with downhole sensors to characterize the location of the stimulation fluid or fracture. The surface acquisition equipment may be connected to the downhole tools/sensors in one more of the ways that will be described hereinafter, and thus may include a connector or transceiver to obtain the data. Further, GPS, or other high precision clock reference may be included for overall system synchronization.

Additional surface equipment may include stimulation equipment 110 for providing the needed pressure and fluid for the stimulation operation. For example, the stimulation equipment may include a pump 111, a fluid container/storage unit 112, a controller 114 for controlling additives or proppant to the fluid. The stimulation equipment and the surface acquisition equipment may also be communicably coupled to provide real-time adjustments in the stimulation operation based on downhole sensor information.

Figure 2:
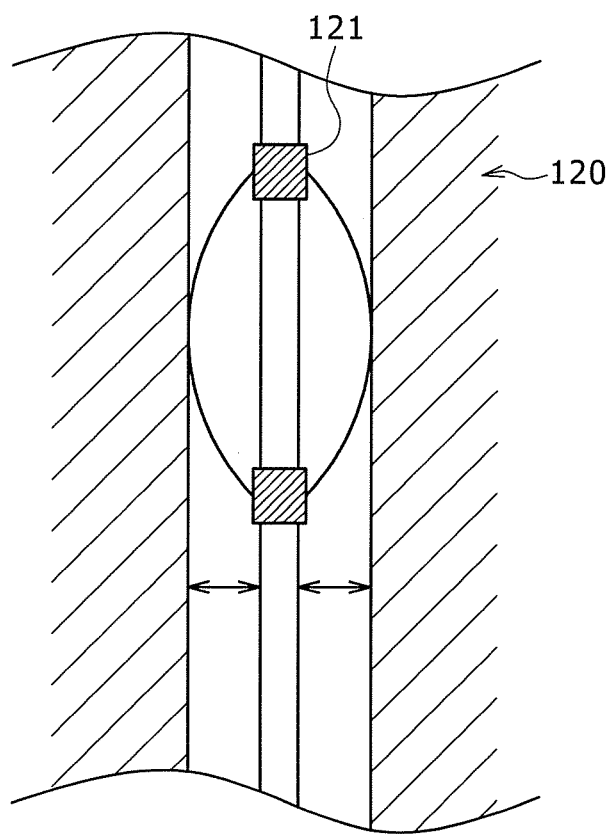
FIG. 2 is a schematic side elevation view of an eccentralizer utilized in conjunction with stimulation operations, according to an embodiment of the present disclosure.

In addition to the above surface equipment and the later described embodiments, the present system may highly benefit from the use of one or more strategically placed eccentralizers 120. For example, eccentralizers 120 may be placed near tubing joints above and below each tool station, among other places. As illustrated in FIG. 2, these eccentralizers may include electric and/or optical connectors 121, but have the main purpose of the eccentralizers is to offset portions of the tool string in relation to the central axis of the wellbore. Eccentralization is beneficial due to space and clearance constraints around the tool string; making a symmetric design around the tool string axis difficult.

Figure 3A:
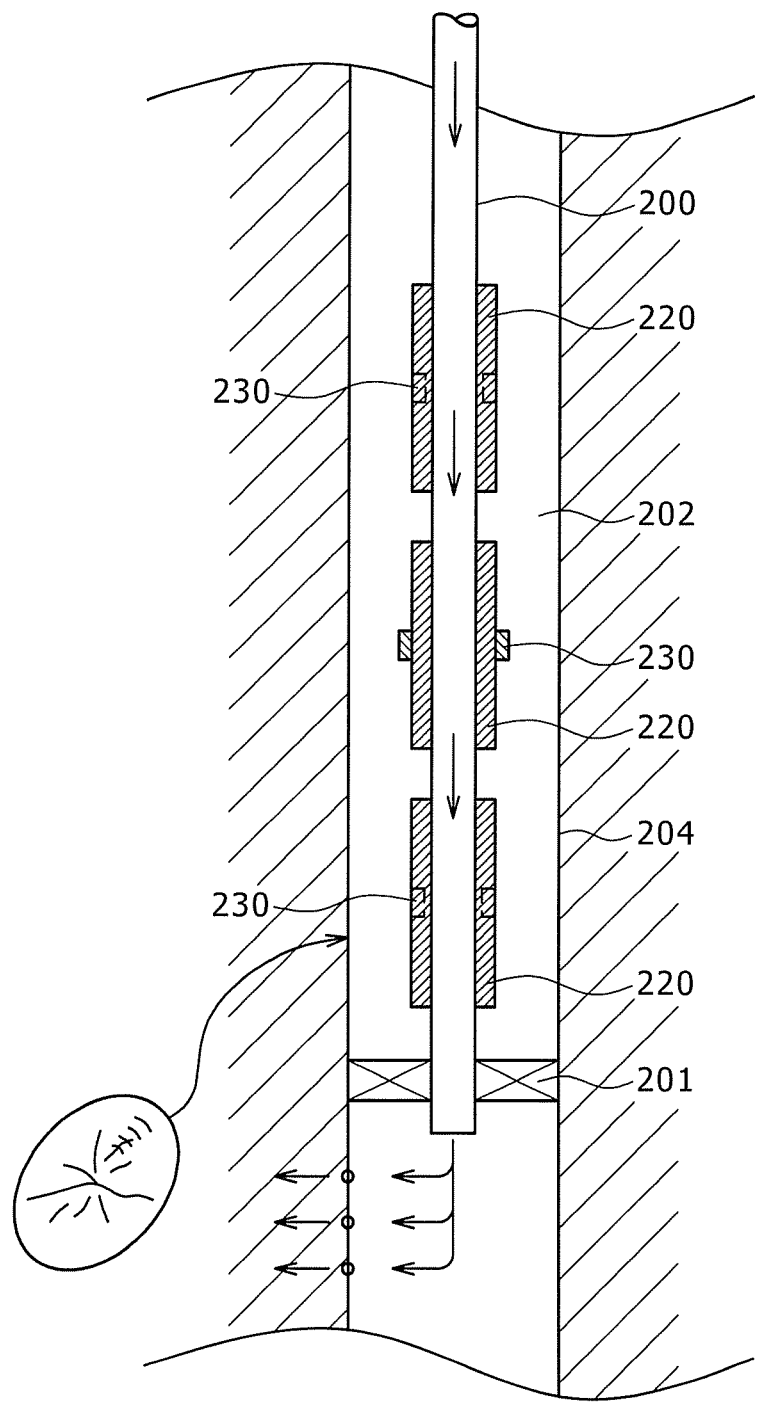
FIG. 3A is a schematic side elevation view, of a toolstring in a wellbore, the tool string including a plurality of shuttles attached to the toolstring, according to an embodiment of the present disclosure.
Figure 4:
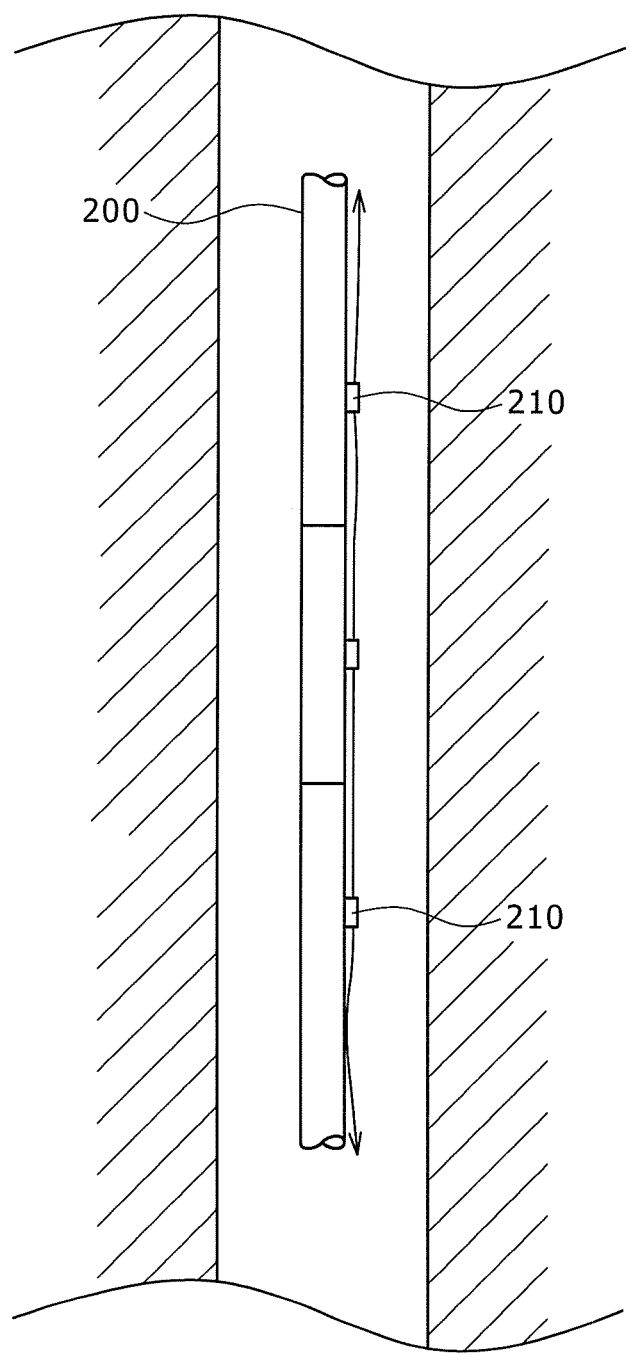
FIG. 4 is a detailed schematic view of a sensors etc. on a tool string, according to an embodiment of the present disclosure.

In one embodiment, as illustrated in FIG. 3A, the system includes a tool string 200 disposed in a wellbore prior to collection of formation data. At this stage, the tool string has been lowered into the stimulation well and a packer 201 has been set or activated at a distal end of the tool string. As such, the packer is now sealing an annulus 202 defined by the tool string and an inner surface of a casing 204. The casing 204 is lining at least a portion of the stimulation well. However, the present disclosure is not limited to the use of drill pipe, but may include other methods of conveyance such as tubing, coiled tubing, among others. All of these contemplated conveyances will be referred to as a tool string. As is illustrated in FIG. 4, each of these conveyances may also comprise devices 210 that can monitor injection rates, downhole pressure, temperature and acoustic formation properties. Such devices may be mounted with clamping devices and distributed along the conveyances means.

The system may be used in wells that have yet to be completed—i.e. that do not have casing 204 or are open bore—but will preferably using in conjunction with cased wells. Once the packer 201 is installed the stimulation well is ready to be stimulated. During the traverse into the stimulation well, shuttles 220 having sensors 230 thereon are in a retracted stage or position, as shown in FIG. 3A. In this position, the shuttles or sensors are engaged or temporarily attached to the tool string and may be lowered into the stimulation well along with the tool string 200 without interference with the wellbore or casing. As such, the tool string along with the shuttle and sensor may have a minimal cross-section such that the tools string and shuttles can easily be deployed.

Figure 3B:
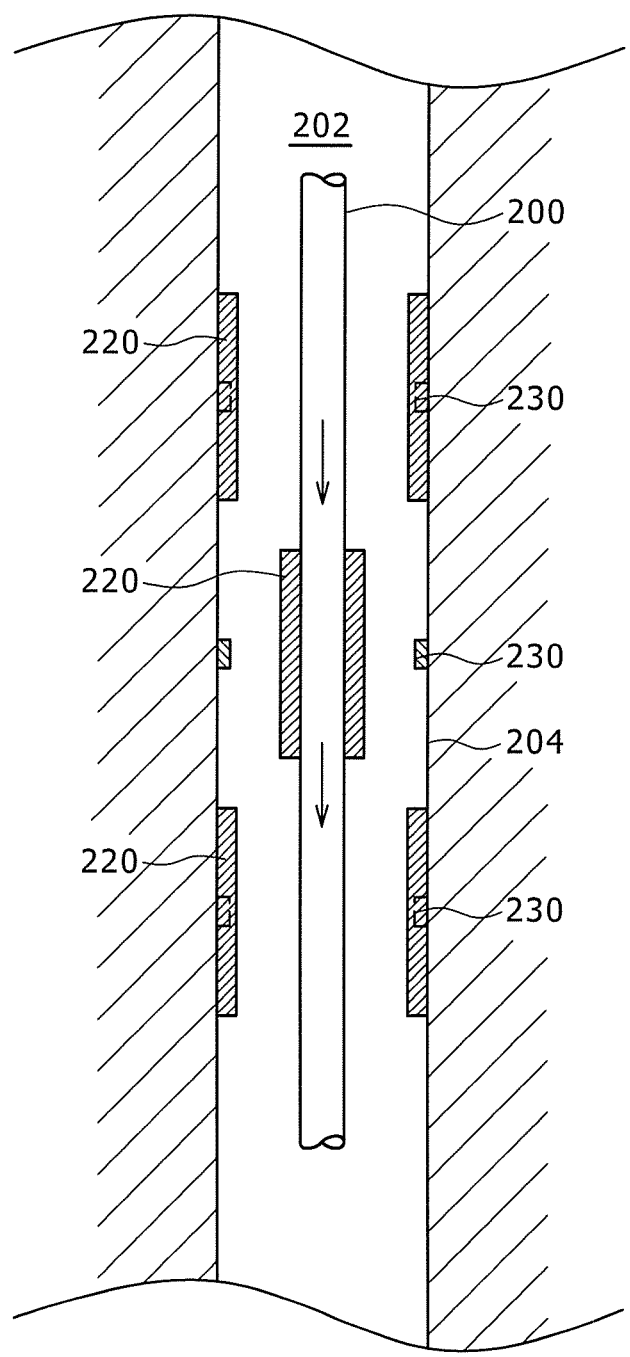
FIG. 3B is a schematic side elevation view, similar to FIG. 3A with the shuttles being coupled to a formation, according to an embodiment of the present disclosure.

Then, prior to stimulation, the shuttles 220 or sensors 230, as shown in FIG. 3B, may be expanded or removed from the tool string 200 at a desired location or time, facilitating the acoustical coupling of the sensor to an inner surface of the casing 204 or wellbore, as the case may be. The stimulation, as mentioned previously, may include many accessories and various techniques all of which are contemplated herein but, for clarity and brevity, stimulation, as is shown in FIG. 3A, will be described as pumping fluid into the tool string at a proximate end of the wellbore using a high pressure pump. The fluid traverses a length of the tool string and typically exits the tool string at a location near or under the packer 210. The fluid then enters into the formation through apertures, typically referred to as perforations, located in casing. The fluid then fractures the formation resulting in micro-earthquakes or microseismic activity. Sensors located on the shuttles and/or the tool string receive/obtain the microseismic activity/data.

The data may then be collected, digitized and communicated to the surface acquisition equipment for processing in any of several ways, some of which are discussed herein. In one example, the microseismic data is communicated from the sensor 230 to a memory that is located in the stimulation well, either on the shuttle 220, the tool string 200, or a later described downhole tool/bottom hole assembly (BHA). Once the operation is completed and the tool string is ready to be withdrawn from the stimulation well, the shuttles are activated and sensors are reengaged with the tool string. Once the rest of the system is prepared, such as the packer being released, removed, etc., the tool string along with the shuttles and memory may be brought to the surface.

Even though a single cycle is described, an operation may include many stages or cycles. For example, the packer 201 and shuttles 220 may be set and released multiple times to isolate and treat multiple subterranean zones without full retrieval of the system to the surface. Furthermore, additional packers may be used to aid in the setting of the tool string 200 and/or to aid in the isolation of different formation zones. In addition, packers 201 may be placed in different locations in order to provide alternative functions. For example, packers may be placed above all of the sensors or multiple packers may be spaced at intervals in order to effectively attenuate tube wave noise (i.e., pressure pulses) propagating through the fluid in the annulus (e.g. from surface noise).

The shuttles 220 described herein may have any one of several alternative configurations, varying in the types of sensors and measurement devices, structure, architecture, activation and communication methods, among others. For example, a shuttle as illustrated in FIG. 5, may include one or more additional or secondary sensors 240 (e.g., pressure, temperature, resistivity, optical, etc.), a memory coupled 250 to the various sensors (230, 240), a battery 260 for power, a clock 270 for synchronization, A/D converters 280 to digitize the data from the sensors 230, a controller 290A to start/stop sensor acquisitions, and a controller 290B for shuttle controllability and/or sensor coupling. In addition, but not shown, computer processors may be added to the shuttles specifically for the option of compressing data volume either before storage in the memory (reduces memory consumption) or for transmitting data from memory to surface (to reduce transmission time).

Regardless of the shuttle configuration, there may be three or more shuttles/stations of acoustic sensors selected from any appropriate sensing devices (e.g. geophones, hydrophones, accelerometers, etc.) that generate signals in response to received acoustic energy. A typical sensor combination may include a plurality of tri-axial (3 orthogonal) geophones spaced at 10 to 50-ft intervals or more. The sensors should have good sensitivity to acoustic energy in the microseismic frequency band of approximately greater than 30 Hz and as high as 1 kHz. The sensors 230, once acoustically coupled to the formation/casing 204, should also be properly anchored to provide a solid coupling with the casing and formation. However, the sensors 230 should also be acoustically decoupled or isolated from ambient or background flow noise (e.g., such as vibration) within the tool string or tubing 200.

Figure 6:
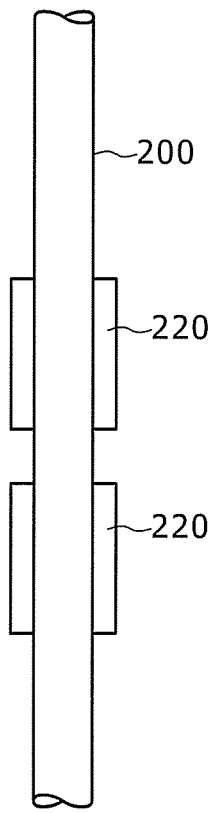
FIG. 6 is a schematic side elevation view, of one possible stand alone configuration of a plurality of shuttles, according to an embodiment of the present disclosure.

One exemplary configuration of shuttles, shown in FIG. 6, includes a plurality of stand-alone shuttles 220 wherein the shuttles are not connected to one another. This would require that each shuttle be an autonomous unit and include at least a sensor 230, a memory, a battery, a clock for time stamping the data that is received with the sensors, a transceiver and one or more controllers. With these components, the shuttle may be controllable down hole and have the necessary components to collect and store the data.

Controllers may be of various configurations, activation methods, and perform different functions. For example, one controller may be for engaging/disengaging or clamping/unclamping the shuttle and/or for acoustically coupling/decoupling the sensor 230 from the stimulation well. Another controller may start/stop the acquisition of data with the sensor and maintaining synchronization with the high precision clock. These controllers may have built in logic for analyzing signals from various sensors responding to signals transmitted (as downlinks) from the surface. For example hydrostatic pressure could be manipulated in a "Morse Code" type or other pulse pattern to send a signal to a downhole controller. Alternatively or in addition to, electro-magnetic signals could be used.

As such the shuttle 220 may be triggered by coded pressure pulses or other uphole signals to engage or disengage with the tool string. Similarly, the same methodology may be used to triggered signal acquisition. In addition to these exemplary embodiments, other communication methods may be used to allow signals to travel between the surface and downhole. For example, there may be an electro-magnetic (EM) downlink through the formation or acoustic vibration (through tubing). With these methods and in some other cases, repeaters may be used to facilitate or boost the signal for long distance communication.

Figure 7:
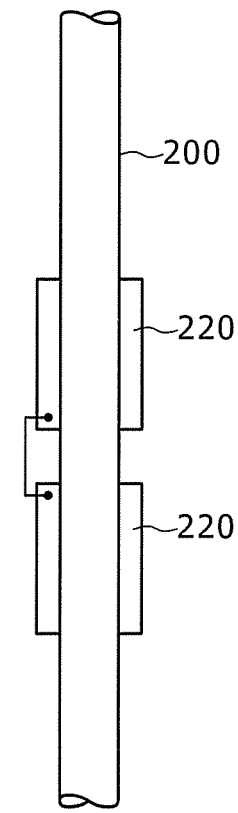
FIG. 7 is a schematic side elevation view, of another possible configuration of a plurality of shuttles connected to each other, according to an embodiment of the present disclosure.

In another exemplary configuration, shown in FIG. 7, shuttles 220 may be communicably coupled to each other either through wires or wirelessly. The shuttles in this configuration may include all of the components of the above configuration, but may now have the ability with the proper transceivers to communicate data/power amongst the shuttles. In this configuration, the shuttles may share one or more of the previously discussed components, such as the memory, clock, controllers, etc.

Figure 8:
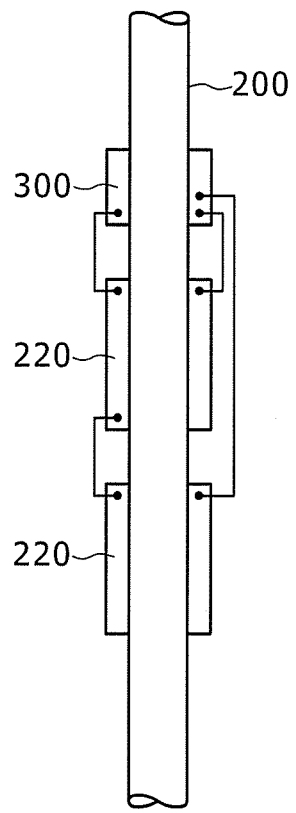
FIG. 8 is a schematic side elevation view, of another possible configuration of a plurality of shuttles connected to a hub, according to an embodiment of the present disclosure.

In another configuration, shown in FIG. 8, a plurality of shuttles 220 may be configured to communicate with a hub 300. The hub 300 may be a dedicated communications hub that is communicably coupled to one or more of the shuttles, or may be the tool string or the BHA/tool. Therefore, the hub may be disposed in the annulus, may be part of the BHA, or elsewhere depending on the design. Again, the hub and shuttles and their associated sensors may be coupled through wires or wirelessly, and may include all of the components of the above configuration. One of the benefits of the wired version would be the sharing and/or distribution of power between the hub and the various shuttles/devices. The communication between the shuttles, sensors, and the hub may be in parallel or in series but, regardless, could provide additional enhancements. For example, the hub may include a central memory for storing the data from the sensors. The hub may also include a connector for providing connection access to all of the downhole acquired data.

Figures 9, 10, 11:
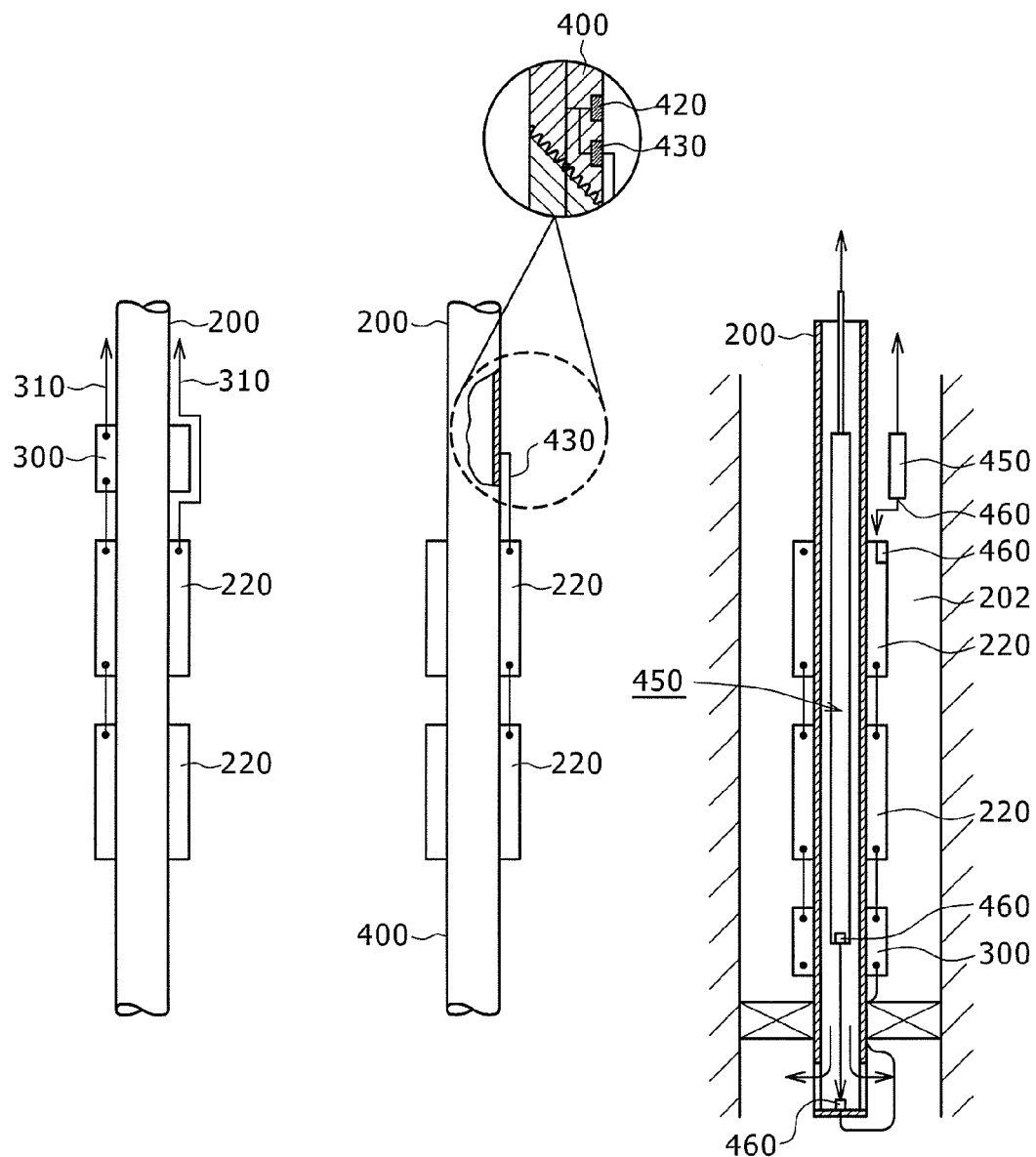
FIG. 9 is a schematic side elevation view, of another possible configuration of a plurality of shuttles connected to the surface, according to an embodiment of the present disclosure.
FIG. 10 is a schematic side elevation view, of another possible configuration of a plurality of shuttles using wired drill pipe, according to an embodiment of the present disclosure.
FIG. 11 is a schematic side elevation view, in partial cross-section, of a tool string having shuttles, with a communications device inside the tool string/annulus for retrieving microseismic data, according to an embodiment of the present disclosure.

In another configuration, shown in FIG. 9, a plurality of shuttles 220 and/or the hub 300 are communicably coupled to the surface for real time data transfer between the surface and the downhole devices. In this configuration, the hub may be connected to or include telemetry device 310 for sending the downhole information to the surface or for receiving information from the surface (e.g., instructions, synchronization signals, etc.). For example, the telemetry device may include electrical, optical, or hydraulic communication conduits such as copper and/or fiber optic cable clamped to the side of or disposed inside of the tool string 200. These conduits may be brought out to the surface acquisition system through a wellhead outlet. The hub could also include a clock to which other clocks or sensors are synchronized.

When hardwired to the surface, the tool string, hub, shuttle, sensor and/or a later described BHA may not require some components to be provided downhole, such as a memory or a battery. In addition, the various downhole devices may be communicably coupled for activation/de-activation, and data collection/completing through the wired connection, for example. Alternatively, the shuttle 220 may include a receiver or transceiver for wirelessly communicating between one or more of the locations named above. In such a case, the tool string, hub, and/or BHA, for example, would also have the necessary hardware (e.g., transceiver, etc.) to establish a wireless communication with the shuttles.

In another embodiment, as seen in FIG. 10, the tool string 200 may include one or more sections of wired drill pipe 400 (WDP) for communicably coupling the surface acquisition system to the sensors, BHA and/or shuttle 220 (among other downhole devices). Depending on the design and features of the WDP, the WDP may provide communications and/or a power link between the surface and the downhole devices. In addition, the WDP may be modified or may be particularity made to include one more sensors (e.g., pressure, hydrophone, geophone, etc.) 420 to aid in the collection of downhole data. Further, the WDP may include connections to provide a link 430, communication, power or otherwise between the shuttles. Such devices may be mounted with clamping devices and distributed along the WDP or may be disposed within the WDP. The WDP may also include other electronic components, such as memory and telemetry components, among others.

In addition to or in conjunction with the above configurations, there are several other ways of obtaining the downhole data without retrieving the entire tool string 200 and/or the shuttles 230 from the wellbore. For example, as illustrated in FIG. 11, in one embodiment the system may include a communications device 450 that is lowered into, onto, or proximate to the tool string 200 and/or the annulus 202. The communications device 450 may be communicatively coupled to the shuttles, sensors, hub or BHA to retrieve the stored downhole data. In some situations, an embodiment may be configured such that the communications device and the shuttles, hub or BHA include a wet connection 460 to removably physically couple the various devices together. A wet connection as used herein may include any type of connector, be it optical, copper, etc. or a combination thereof, known to those of skill in the art, which is able to establish a physical connection between devices while in a downhole environment.

When using a wet connect, the operation may include sending or lowering the communication device 450 downhole, such as through the annulus or the tool string, and then making a connection downhole. Once the connection is made, information, such as downhole information from the sensors, the clocks, etc., and uphole information from the surface may be communicated between the various devices. The communication device may itself be communicably coupled to the surface and send the downhole information uphole right away.

Alternatively, in some cases the communication device may include a memory and other electronic components, such as a battery, etc., for storing the data in the communication device until the communication device is brought to the surface. In some cases, a communication device may comprise or be part of a wireline or slickline tool. As stated previously, in some embodiments the communications device may not include a wet connection, and may communicate between the hub or shuttles wirelessly using for example electro-magnetic or acoustic means, among others.

Figure 12:
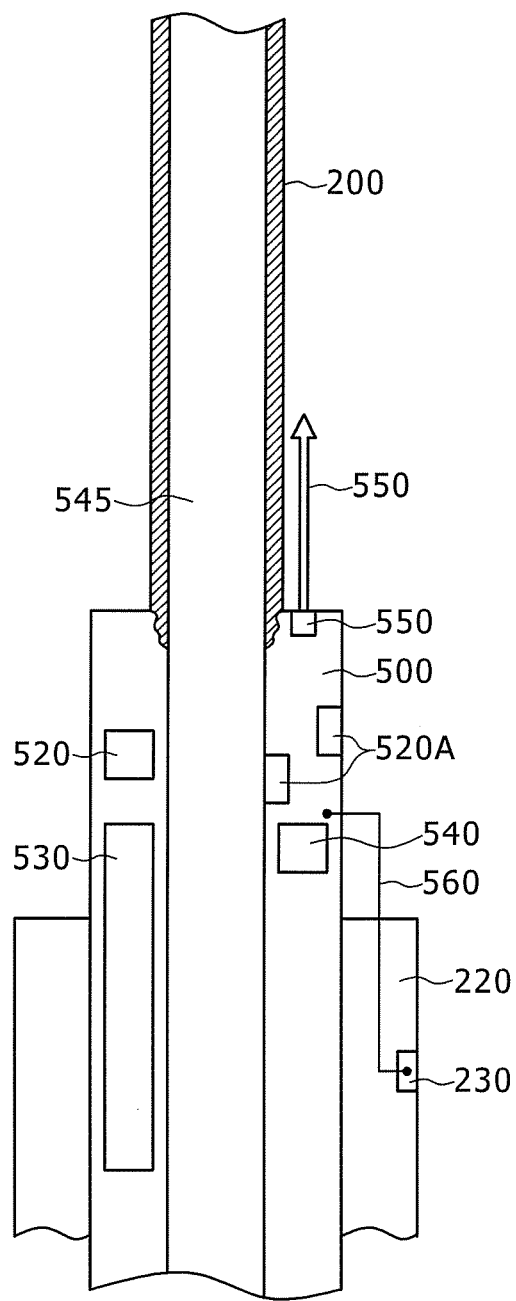
FIG. 12 is a schematic side elevation view, of a tool string with a detailed view of a tool attached to a distal end thereof, according to an embodiment of the present disclosure.

The stool string may include a BHA 500 or tool disposed at a distal end thereof. Such an example tool is illustrated in FIG. 12 and may include, but is not limited to, many types of sensors 520, pressure sensors 520A, and electronics 530, for obtaining, collecting, storing and/or communicating downhole data between the BHA or tool and the surface. The tool may include other measurement devices 540 along with seismic measurements such as pressure, temperature, gyro, or any other device that may measure indications of stimulation and fracture characteristics.

At a first end, the BHA 500 is connected to drill pipe to comprise the tool string, and includes an opening 545 to a flowpath through the BHA for stimulation fluid being pumped from the surface. At a second end the BHA includes another opening that defines the other end of the flowpath through the tool, at which point the fluid exits the tool string on its way to the formation. The BHA includes an exterior surface that may define part of the annulus and includes an interior surface that at least partially defines the flowpath. The tool may further include one or more pressure sensors located so as to measure the pressure of one or more of the tool string, formation, annulus, or any combination thereof. The BHA may also include the necessary components—such as a telemetry device 550—to communicate data between the sensors and the surface. The BHA may also include the connections 560, transceivers etc. for providing a coupling wired or wirelessly to the shuttles, sensor or hub.

The shuttle 220 may also have various features and may operate in many differing ways. However, all of the shuttles contemplated herein can at minimum be activated to disengage the shuttle or sensor 230 from a tool string 200 and to engage an inner surface of a wellbore or casing. Preferably, the shuttles are controllable and can thus be activated and re-activated as desired with regards to time or location. The shuttles may be activated or triggered to engage or disengage using one of the methods discussed earlier.

The power to engage or disengage the shuttle 220 or sensor 230 may be provided though a hydraulic solution that relies on break plugs, shear pins or on the rupture of some mechanical components (e.g., such as rupture disks, etc.) as a reaction to an over-pressure in the annulus above a certain threshold. The power may also come from an electric solution that can be controlled with an electronics or digitalization box. Still another option is to use the power of the hydrostatic pressure available surrounding the tool, or using a piston and cylinder system to generate the necessary movement. Leak through plugs or alternatively electromechanical systems like solenoid valves may be used in the design to transform the trigger signal into an active command so as to let the hydrostatic power act passively. Solutions based on powering the activation and deactivation with a motor driving the actuation system are not excluded (e.g., such as a fully electric solution) but may require the use of additional electronics.

Figure 13A:
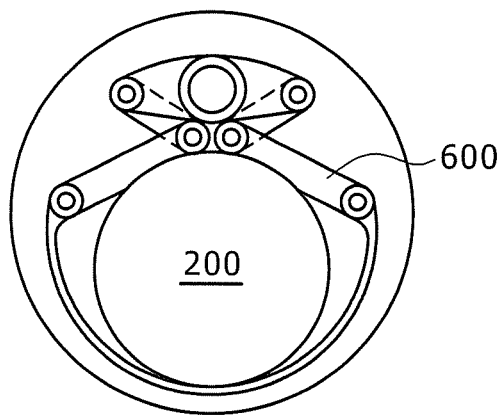
FIG. 13A is a plan view, in partial cross-section, of a shuttle mechanism attached to a tool string, according to an embodiment of the present disclosure.
Figure 13B:
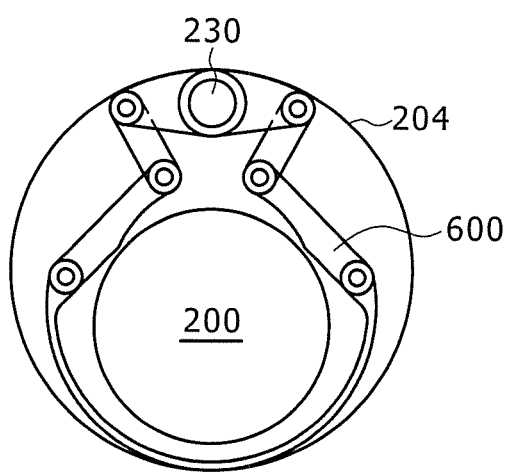
FIGS. 13B and C are plan views, in partial cross-section, of the shuttle detaching from the tool string and coupling to an inner surface of a casing, according to an embodiment of the present disclosure.
Figure 13C:
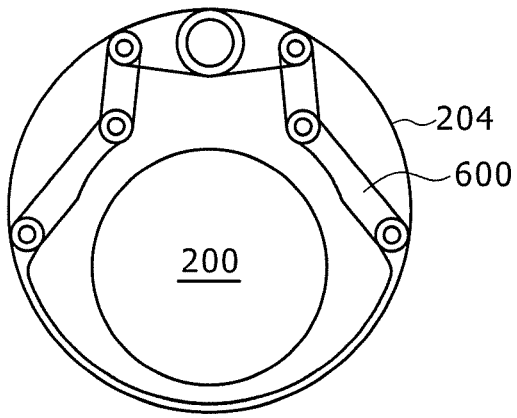
FIG. 13D is a plan view, in partial cross-section, of the shuttle detached from the tool string and coupled to the inner surface of the casing, according to an embodiment of the present disclosure.
Figure 13D:
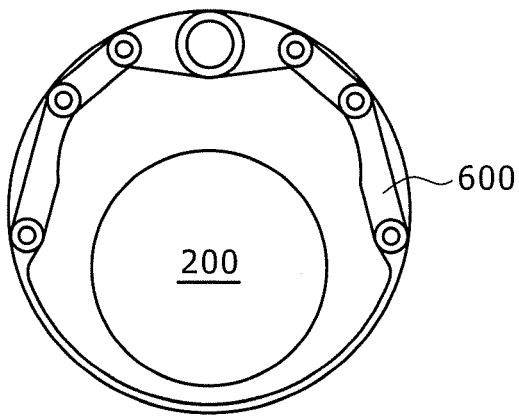
Figure 14A:
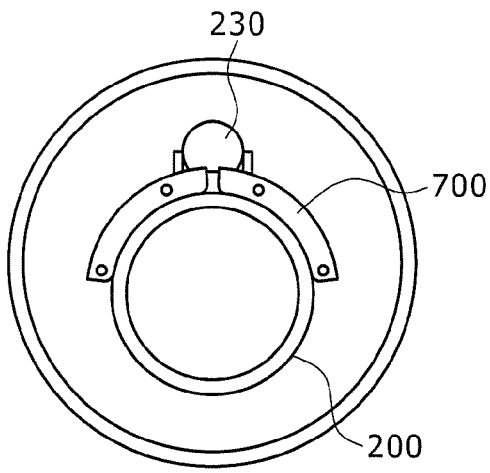
FIGS. 14 A-F are plan views, in partial cross-section, of another exemplary shuttle mechanism, according to an embodiment of the present disclosure.
Figure 14B:
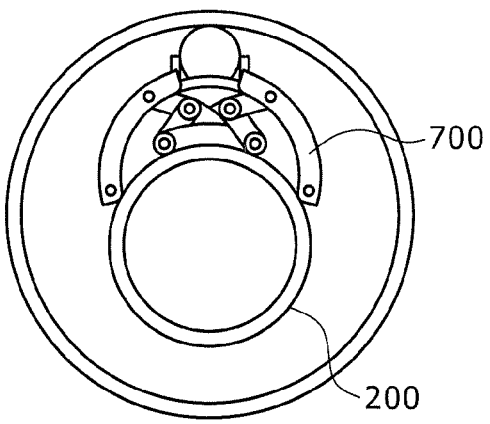
Figure 14C:
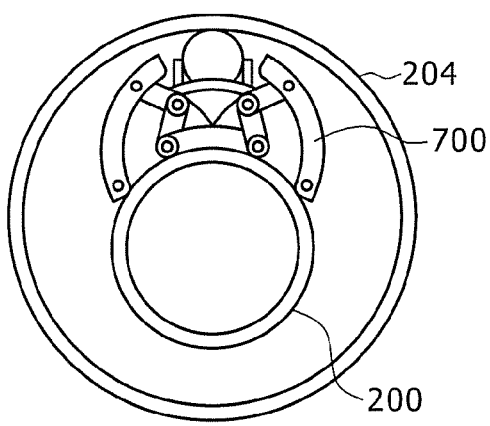
Figure 14D:
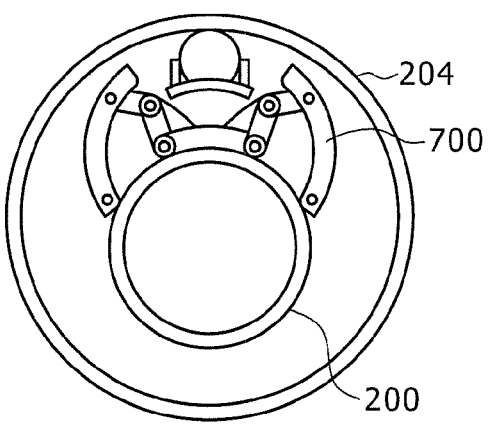
Figure 14E:
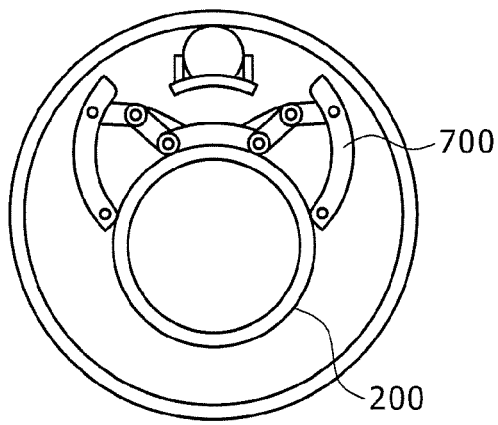
Figure 14F:
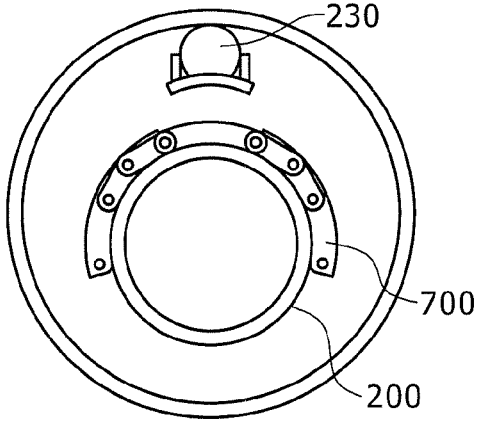

An exemplary shuttle mechanism 600 is shown in FIGS. 13A-C. This shuttle mechanism includes an articulated spring loaded sensor platform that has two stable positions. When running the tool string 200 in and out of the wellbore, a resilient force collapses the platform so that it grips or attaches to an outer surface of the tool string. When at the desired depth or time, the platform can be deployed to acoustically couple the sensor with an inner surface of the casing 204 or wellbore. During deployment the platform structure passes an "over center" position beyond which the resilient force maintains the sensors 230 in stable contact with the casing. At this "over center" position, the sensor 230 is acoustically decoupled from the tool string.

Another exemplary mechanism 700 is shown in FIGS. 14A-F. This shuttle mechanism includes a magnetic sensor package deployed and retrieved mechanically with a structure installed on the tool string 200. The sensor package 230 may be deployed by outer arms to magnetically and acoustically couple the sensor package with the inner wall of the casing. Once the sensor package is acoustically coupled with the casing, the outer arms may retreat to their previous position around the tool string, thereby acoustically decoupling the tool string from the sensor package.

After recording of microseismic activity, the sensor package may have sides with slots, such that outer arms can penetrate and grip to guide the sensor package away from the casing. The sensor package along with the outer arms may then reengage with the tool string for withdrawal from the stimulation well or movement to another stimulation location.

Another option is to use the outer arm to contact a surface on the sensor package "from the top" while a spring-loaded system maintains a contact "from below." Adaptation to different casing inner diameters can be accomplished by changing the offset (eccentricity) in the eccentralizer or by adding/modifying stand-off parts without any fundamental redesign. Another feature is the inclusion of permanent magnets on the sensor package.

Another exemplary mechanism 800 is shown in FIGS. 15A-C. This mechanism is mounted around a mandrel with a non-cylindrical outer surface (e.g., hexagonal for example). The mandrel forms part of the tubing string 200 used to inject fracturing fluids. A sensor package is located in a recess in the platform and connected to the platform by springs or other resilient members. When running the tubing string in and out of the well the sensor platform is engaged or coupled firmly on the mandrel, protecting it from contacting the casing 204, and the sensor package is retracted within its recess with the springs compressed.

At the desired depth the platform is activated or deployed to allow one side of the platform to contact the inner surface of the casing, while the resilient members acoustically couple the sensor package against the opposite side of the casing. At this point, the sensor package and platform are acoustically decoupled from the mandrel. After deployment, the platform may form a barrier limiting the propagation of unwanted acoustic noise from the mandrel (or elsewhere) to the sensors. In case of unintended rotation of the tubing string, the non-circular mandrel design ensures that the sensor platform also rotates and remains retrievable.

Further, various other components may be included and called upon for providing for aspects of the teachings herein. For example, a sample line, sample storage, sample chamber, sample exhaust, pump, piston, power supply (e.g., at least one of a generator, a remote supply and a battery), vacuum supply, pressure supply, cooling component, heating component, motive force (such as a translational force, propulsional force or a rotational force), magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

Elements of the embodiments have been introduced with either the articles "a" or "an." The articles are intended to mean that there are one or more of the elements. The terms "including" and "having" are intended to be inclusive such that there may be additional elements other than the elements listed. The term "or" When used with a list of at least two elements is intended to mean any element or combination of elements.

It will be understood from the foregoing description that various modifications and changes may be made in the preferred and alternative embodiments of the present invention without departing from its true spirit. In addition, this description is intended for purposes of illustration only and should not be construed in a limiting sense.

What is claimed is:

1. A method of monitoring microseismic activity around a stimulation well, the method comprising:
   activating a packer disposed at a lower end of the tool string to seal an annulus defined by the tool string and an inner casing surface;
   temporarily attaching at least one shuttle comprising a sensor able to detect microseismic events to the exterior of the tool string;
   activating the shuttle in the wellbore by acoustically coupling the sensor to the inner casing surface;
   physically detaching the sensor from the tool string so that the sensor is acoustically decoupled therefrom;
   hydraulic fracturing the formation via the tool string;
   recording microseismic data-via the sensor; and
   reattaching the sensor to the tool string.

2. The method of claim 1, further comprising storing the microseismic data, wherein storing comprises storing the data into a memory disposed on the tool string.

3. The method of claim 1, wherein recording the microseismic data further includes compressing the microseismic data to reduce data volume.

4. The method of claim 1, further including retrieving at least a portion of the microseismic data prior to removing the tool string from the stimulation well.

5. The method of claim 4, wherein retrieving at least a portion of the microseismic data includes lowering a communications device into one of the tool string or the annulus to a location proximate the shuttle and communicably coupling with the tool string.

6. The method of claim 1, wherein the tool string includes a tool disposed near a distal end of the tool string, the tool communicably coupled to a memory storage device for the microseismic memory.

7. The method of claim 6, wherein the tool includes at least one pressure sensor for measuring at least one of a static pressure in the annulus or a pressure of the formation.

8. The method of claim 6, wherein the tool string comprises wired drill pipe and the tool is communicably coupled to the wired drill pipe.

9. A method of monitoring microseismic activity in a formation interacting with a stimulation well, the method comprising:
   engaging at least one shuttle comprising a sensor able to detect microseismic events on a tool string;
   activating the shuttle in the stimulation well by coupling the sensor to an inner casing surface;
   physically detaching the sensor from the tool string;
   injecting fluid into the formation via the tool string;
   generating microseismic data via the sensor;
   storing the microseismic data into a memory communicably coupled to the sensor; and
   reengaging the sensor to the tool string.

10. The method of claim 9, further including retrieving at least a portion of the microseismic data from the memory prior to removing the tool string from the stimulation well.

11. The method of claim 10, wherein retrieving at least a portion of the microseismic data includes lowering a communications device into the tool string to a location proximate the tool string and communicably coupling the memory to the communications device.

12. The method of claim 9, further comprising compressing the microseismic data prior to storing in the memory.

13. The method of claim 9, wherein the tool string includes at least one pressure sensor for measuring one of a static pressure in an annulus defined by the tool string and the inner surface of the casing lining the stimulation well or a pressure of the formation.

14. The method of claim 9, wherein the tool string comprises wired drill pipe communicably coupled to the tool string.

15. The method of claim 9, wherein generating microseismic data with the sensor comprises generating microseismic data during the fluid injection.

16. An apparatus for monitoring microseismic activity in a stimulation well interacting with a formation, the apparatus comprising:

a tool string;

a packer disposed at a lower end of the tool string for sealing an annulus defined by the tool string and an inner casing surface;

at least one controllable shuttle comprising a sensor able to detect microseismic events temporarily attached to the tool string, wherein the shuttle is configured to acoustically couple the sensor to the inner casing surface and physically detach the sensor from the tool string as well as reattach the sensor to the tool string; and wherein the tool string is configured for injecting operations into the formation.

17. The apparatus of claim 15, further including at least one sensor configured for determining a parameter other than microseismic activity.

18. The apparatus of claim 15, wherein the tool string comprises wired drill pipe communicably coupling the sensor to a surface station.

19. The apparatus of claim 15, wherein the tool string further comprises a data compressor for compressing the microseismic data detected by the sensor.

20. The apparatus of claim 15, wherein the tool string further comprises two or more shuttles in the tool string.

* * * * *